(12) United States Patent
Roush et al.

(10) Patent No.: US 8,226,365 B2
(45) Date of Patent: Jul. 24, 2012

(54) SYSTEMS, METHODS, AND APPARATUS FOR THERMALLY ISOLATING A TURBINE ROTOR WHEEL

(75) Inventors: Eric Roush, Simpsonville, SC (US); Daniel Hynum, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 626 days.

(21) Appl. No.: 12/428,067

(22) Filed: Apr. 22, 2009

(65) Prior Publication Data

US 2010/0272568 A1 Oct. 28, 2010

(51) Int. Cl.
*F01D 5/18* (2006.01)

(52) U.S. Cl. ...... 416/190; 416/220 R

(58) Field of Classification Search ...... 416/190, 416/220 R
See application file for complete search history.

(56) References Cited

U.S. PATENT DOCUMENTS

| | | | |
|---|---|---|---|
| 3,834,831 A | 9/1974 | Mitchell | |
| 5,201,849 A | 4/1993 | Chambers et al. | |
| 5,388,962 A | 2/1995 | Wygle et al. | |
| 5,630,703 A * | 5/1997 | Hendley et al. | 416/95 |
| 6,341,939 B1 | 1/2002 | Lee | |
| 6,416,284 B1 | 7/2002 | Demers et al. | |
| 6,638,013 B2 * | 10/2003 | Nguyen et al. | 415/115 |
| 6,776,583 B1 | 8/2004 | Wang et al. | |
| 7,189,063 B2 | 3/2007 | Honkomp | |
| 2005/0201857 A1 | 9/2005 | Ferra et al. | |

\* cited by examiner

*Primary Examiner* — Chandra Chaudhari

(74) *Attorney, Agent, or Firm* — Sutherland Asbill & Brennan LLP

(57) ABSTRACT

Embodiments of the invention can provide systems, methods, and an apparatus for thermally isolating a turbine rotor wheel. According to one embodiment, a method for thermally isolating a turbine rotor wheel can be provided. The turbine rotor wheel can include a pair of blade posts, or shanks, supporting respective turbine rotor blades such that a shank cavity is formed between respective blade posts. To thermally isolate the turbine rotor wheel, at least one seal operable to partition the shank cavity into an upper region and a lower region can be provided. In addition, this seal can be inserted within the shank cavity to partition the shank cavity into an upper region and a lower region. In doing so, cooling air flow can be divided between the upper region and the lower region so that the lower region can be maintained at a lower temperature than the upper region.

20 Claims, 7 Drawing Sheets

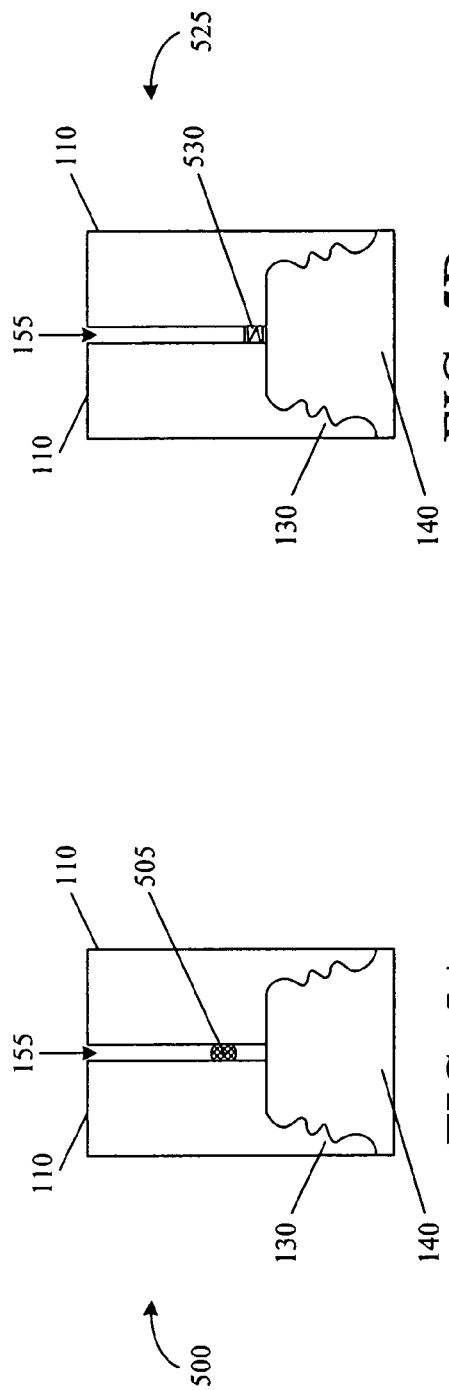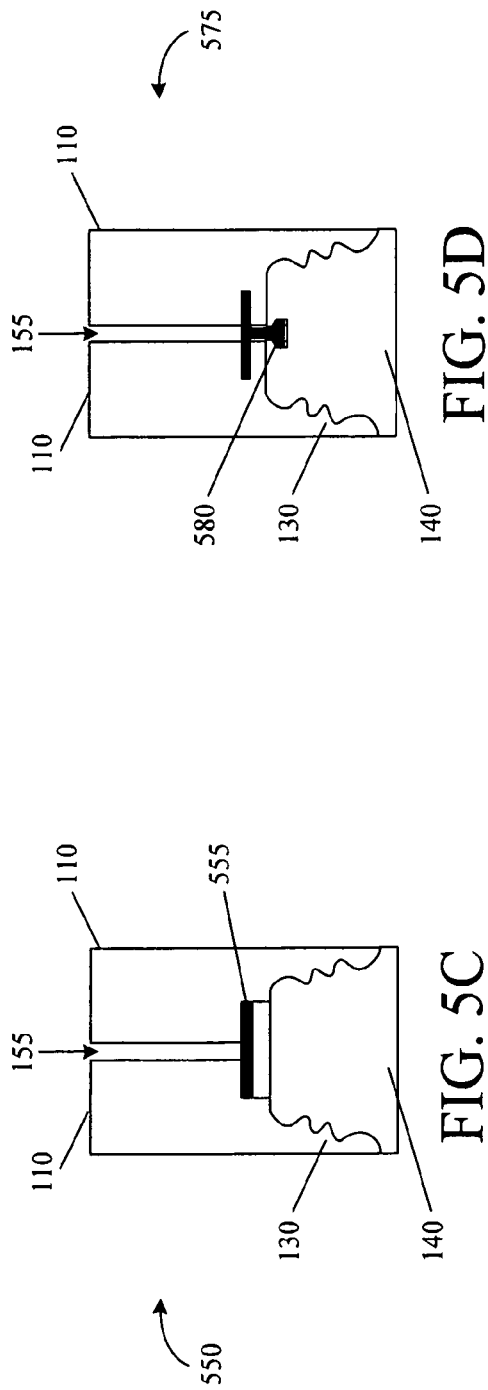

SYSTEMS, METHODS, AND APPARATUS FOR THERMALLY ISOLATING A TURBINE ROTOR WHEEL

FIELD OF THE INVENTION

The invention relates to a turbine rotor wheel, and more specifically, to systems, methods, and an apparatus for thermally isolating a turbine rotor wheel.

BACKGROUND OF THE INVENTION

A turbine rotor wheel is part of a turbine that can be part of a gas turbine engine. In a gas turbine engine, a compressor provides pressurized air to a combustor where air is mixed with fuel and the mixture ignited to produce hot combustion gases. These hot combustion gases flow downstream to one or more turbine rotors that extract energy from the hot combustion gases for powering the compressor and for providing useful work, such as powering an electric generator or powering an aircraft in flight.

A turbine rotor can include multiple turbine rotor blades mounted to the perimeter of a turbine rotor wheel, which can rotate about the centerline axis of the engine. As hot combustion gases exit the combustor and flow across the turbine rotor blades, the turbine rotor wheel begins to rotate. In doing so, energy from the hot combustion gases is converted. At the same time, the hot combustion gases subject the turbine rotor wheel to high temperatures, particularly at the turbine rotor wheel's rim. The materials used to construct the turbine rotor wheel, however, can differ from other turbine components such that the turbine rotor wheel is not as resistant to heat. As a result, the high temperatures of the hot combustion gases can exceed the metallurgical limitations of the turbine rotor wheel, causing thermal stresses, oxidation, and structural cracking.

To prevent the turbine rotor wheel from overheating, cooling air can be extracted from the compressor to cool the spaces surrounding and within the turbine rotor assembly, including those in thermal contact with the turbine rotor wheel. Extracting air in this way though, diverts air from the combustor and hampers the efficiency of the engine cycle. Given this loss of efficiency, minimizing the amount of air diverted from the combustor for cooling, without exposing the turbine rotor wheel to additional stresses, is desirable. In addition, the demand for larger and more efficient gas turbine engines requires turbine rotor wheels that can endure higher combustion temperatures without increasing individual component costs.

Thus, there is a need for systems, methods, and an apparatus for thermally isolating a turbine rotor wheel.

BRIEF DESCRIPTION OF THE INVENTION

Embodiments of the invention can address some or all of the needs described above. Certain embodiments of the invention are directed generally to systems and methods for thermally isolating a turbine rotor wheel. According to one embodiment, a method for thermally isolating a turbine rotor wheel can be provided, wherein the turbine rotor wheel includes a pair of blade posts supporting respective turbine blades and wherein a cavity is formed between respective blade posts. The method can include providing at least one seal operable to partition the cavity into an upper region and a lower region. In addition, the method can include inserting the at least one seal within the cavity so that cooling air flow into the cavity is divided between at least the lower region and at least the upper region so that the lower region is maintained at a lower temperature than the upper region.

According to another embodiment of the invention, a system for thermally isolating a turbine rotor wheel can be provided. The system can include a plurality of turbine blades supported by a plurality of blade posts wherein a cavity is formed between respective blade posts. The system can also include at least one seal mounted within the cavity that partitions the cavity into an upper region and a lower region. By partitioning the cavity, cooling air flow into the cavity is divided between at least the lower region and at least the upper region so that the lower region is maintained at a lower temperature than the upper region.

According to yet another embodiment of the invention, an apparatus for thermally isolating a gas turbine rotor wheel can be provided, wherein the turbine rotor wheel includes a pair of blade posts supporting respective turbine blades and wherein a cavity exists between respective blade posts. The apparatus can include an elongated sealing piece operable to mount within the cavity and to partition the cavity into an upper region and a lower region so that cooling air flow into the cavity can be divided between the lower region and the upper region. In this way, the lower region can be maintained at a lower temperature than the upper region.

Other embodiments and aspects of the invention will become apparent from the following description taken in conjunction with the following drawings.

BRIEF DESCRIPTION OF THE DRAWINGS

Figure 1:
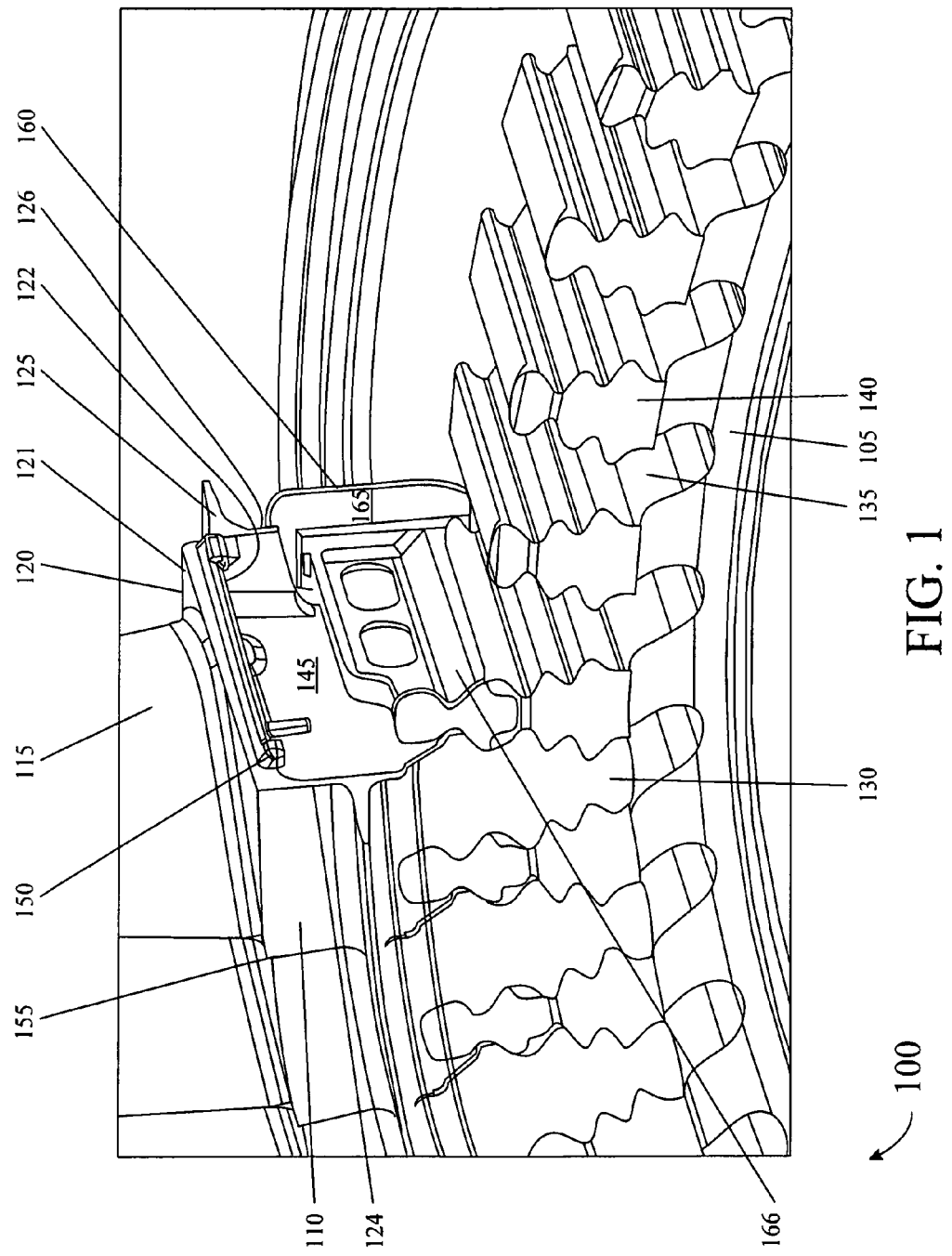

Having thus described the invention in general terms, reference will now be made to the accompanying drawings, which are not necessarily drawn to scale, and wherein:

FIG. 1 illustrates a turbine rotor wheel found in the prior art in three-dimensions.

Figure 2:
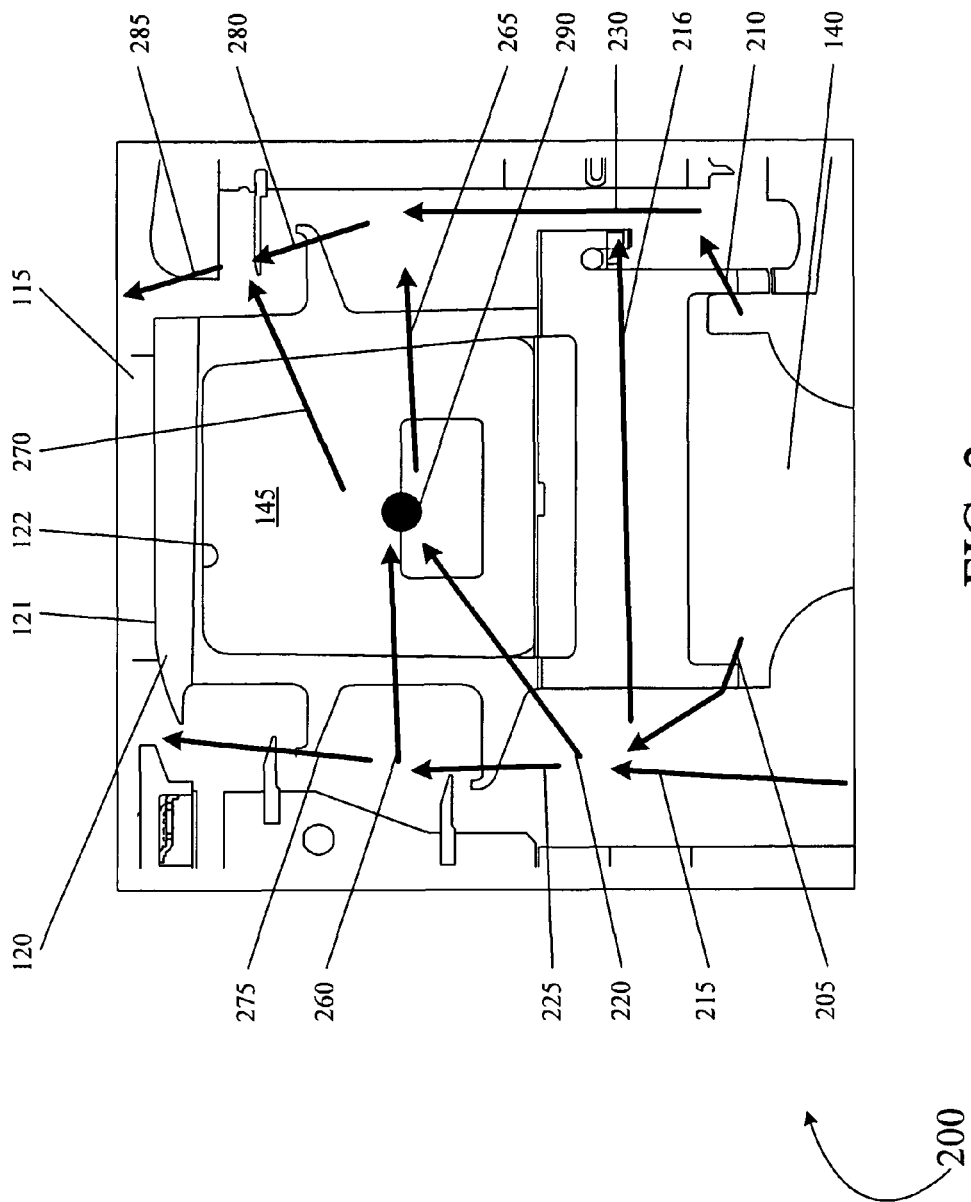

FIG. 2 illustrates a turbine rotor wheel found in the prior art in cross section.

Figure 3:
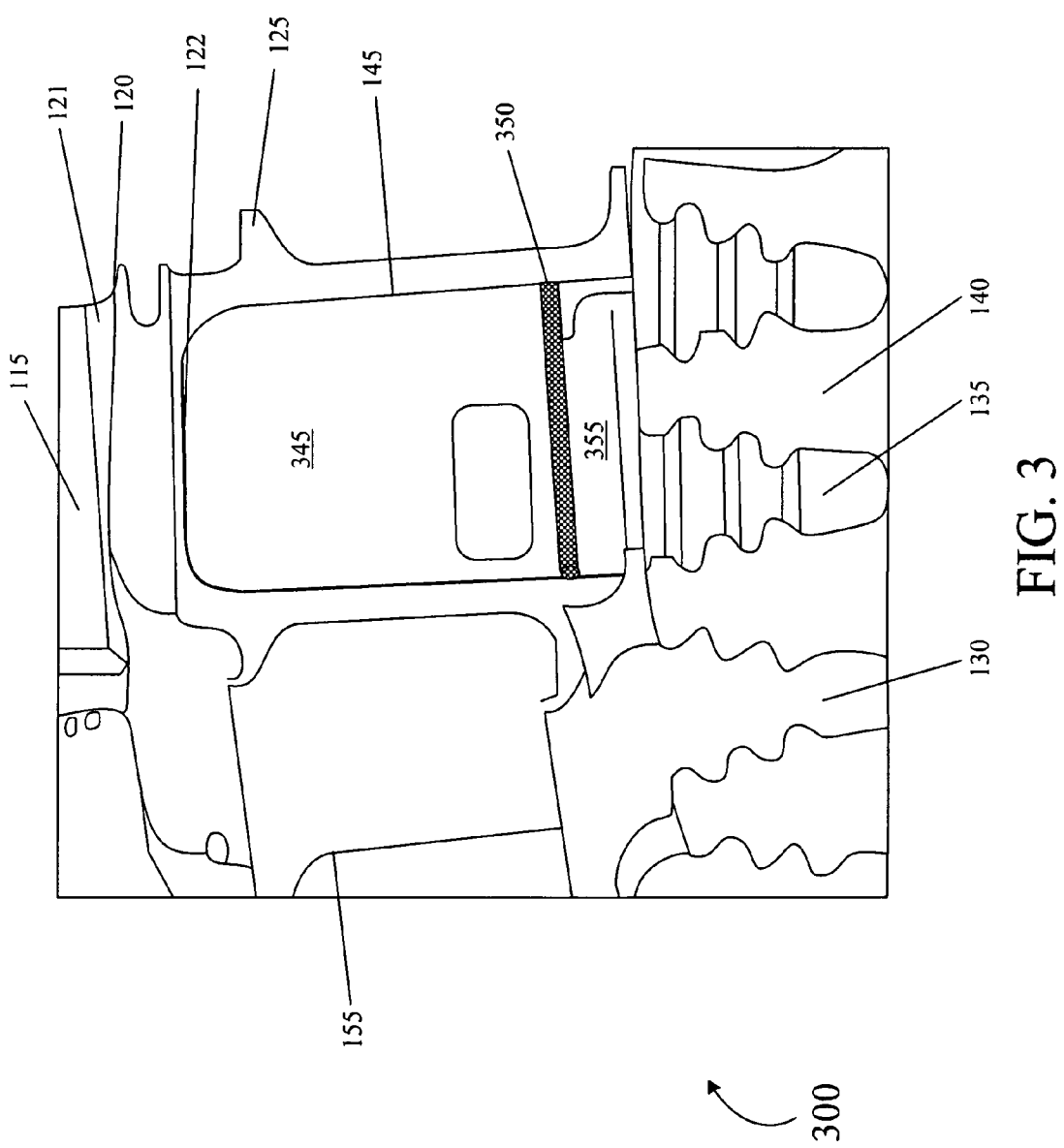

FIG. 3 illustrates an exemplary system for thermally isolating a turbine rotor wheel in accordance with an embodiment of the invention.

Figure 4:
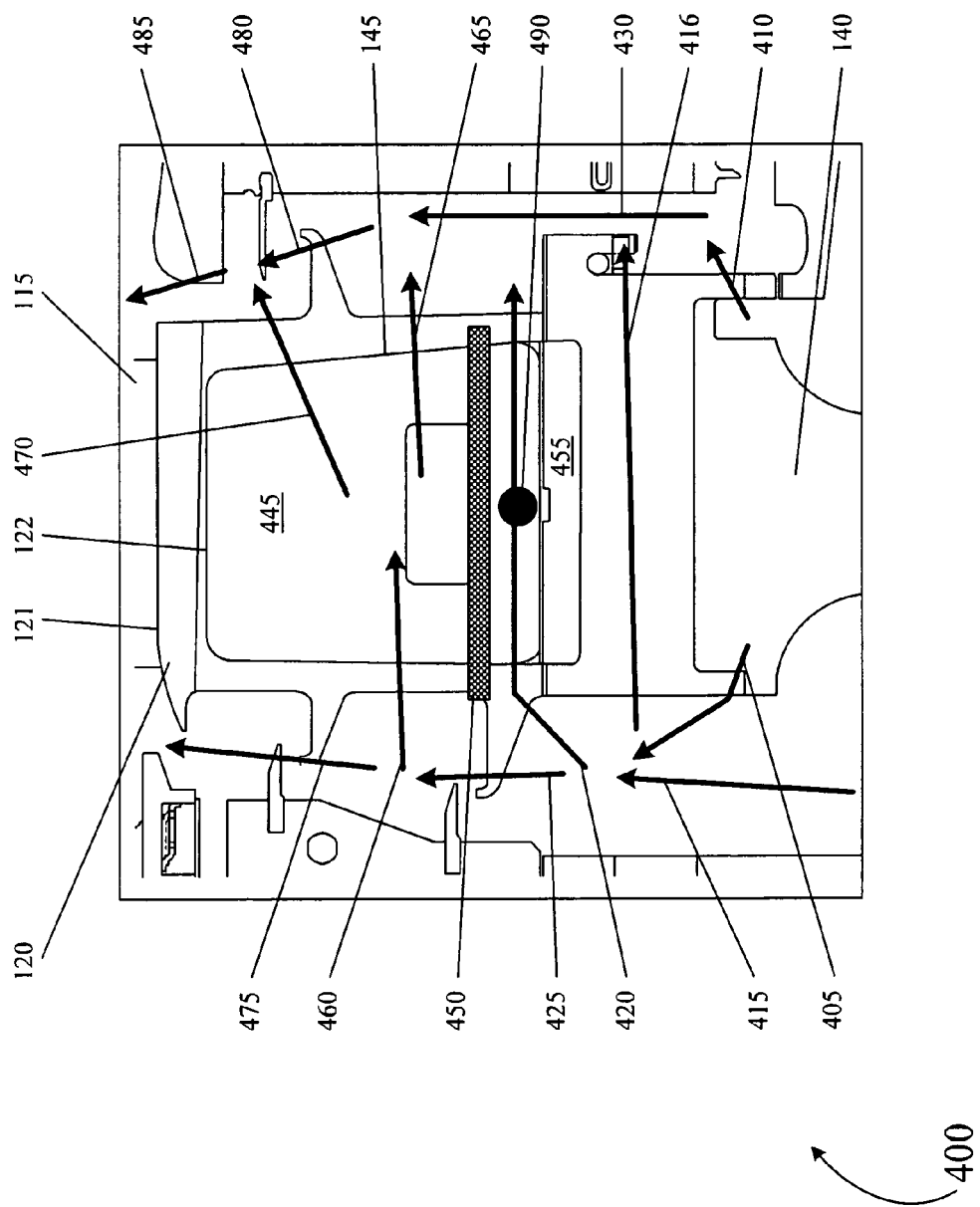

FIG. 4 illustrates a cross-sectional view of an exemplary system for thermally isolating a turbine rotor wheel in accordance with an embodiment of the invention.

FIGS. 5A-5D illustrate various example embodiments of an isolation seal for a turbine rotor wheel.

Figure 6:
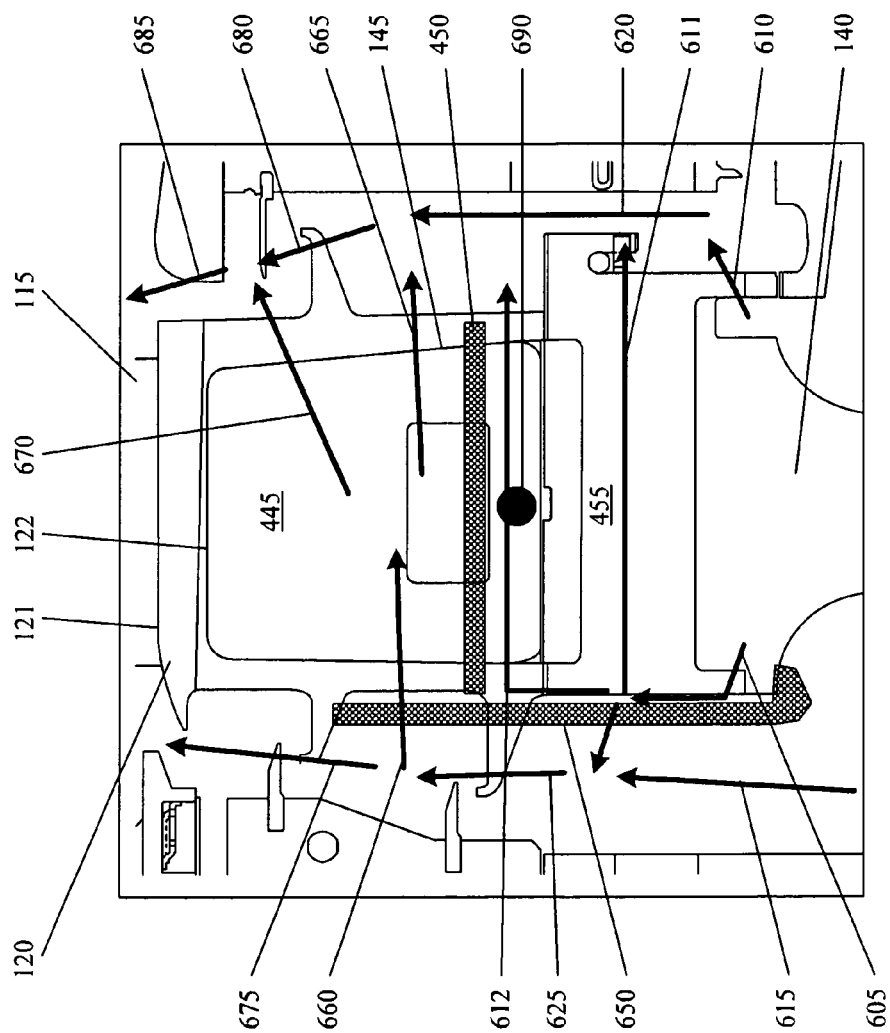

FIG. 6 illustrates a cross-sectional view of an exemplary system for thermally isolating a turbine rotor wheel according to one embodiment of the invention.

Figure 7:
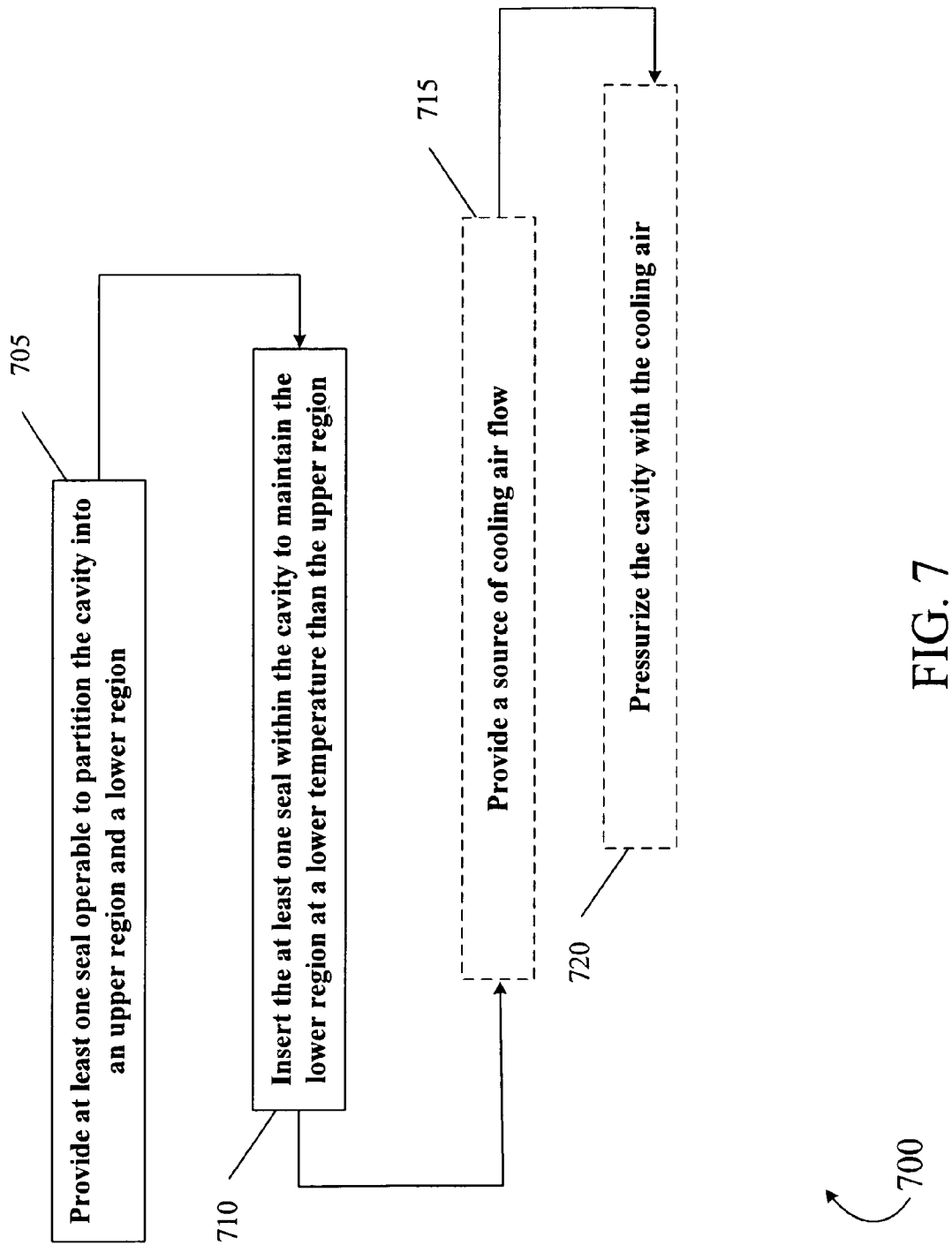

FIG. 7 illustrates an exemplary method for thermally isolating a turbine rotor wheel in accordance with an embodiment of the invention.

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

FIG. 1 illustrates a three-dimensional view of prior art system 100. System 100 includes a turbine rotor wheel 105 configured for use in a gas turbine engine. A gas turbine engine can include a compressor and a turbine arranged on a single shaft. The compressor supplies compressed air to the combustor, which mixes air with fuel and combusts the mixture to produce hot combustion gases. These hot combustion gases flow across the turbine causing it, and the shaft to rotate. Thus, the turbine converts energy in the hot combustion gases to mechanical energy that can be used with a generator for producing electricity, with a turbofan in an aircraft engine for producing thrust, or with other systems for other applications known within the art.

The turbine can include a plurality of turbine rotor wheels each supporting a plurality of turbine rotor blades. As illustrated in FIG. 1, turbine rotor wheel 105 is an annular component that can rotate about the longitudinal axis of the gas turbine engine. Turbine rotor wheel 105 supports a plurality of turbine rotor blades 110 that extend radially into the primary gas stream.

Turbine rotor blade 110 includes airfoil 115, blade platform 120, shank 125, and dovetail 130. Airfoil 115 has a generally concave pressure side and a generally convex suction side connected together at leading and trailing edges. Airfoil 115 extends radially outward from turbine rotor blade platform 120 to a tip (not pictured).

Blade platform 120, formed at the junction of airfoil 115 and shank 125, defines the inner radial boundary of the hot combustion gas stream. Blade platform 120 includes a radial outer surface 121 which defines a portion of the inner boundary for the hot combustion gases, and an opposite, radial inner surface 122. The platform surfaces extend circumferentially from opposite side edges and axially between leading edge 124 and trailing edge 126.

Shank 125, also referred to as a blade post, provides a radial transition from blade platform 120 to supporting dovetail 130, extending radially inward from blade platform 120 to dovetail 130. Dovetail 130 also extends radially inward from shank 125, and couples turbine rotor blade 110 to turbine rotor wheel 105. Turbine rotor wheel 105 includes a plurality of circumferentially alternating dovetail slots 135 and posts 140, with each post 140 formed by adjacent slots 135 and disposed about the periphery of turbine rotor wheel 105. Each slot 135 is adapted to receive dovetail 130 from turbine rotor blade 110.

Shank 125 also includes a substantially concave sidewall and a substantially convex sidewall connected together at an upstream sidewall and a downstream sidewall (not pictured). Accordingly, the concave sidewall is recessed with respect to the upstream and downstream sidewalls so that when a plurality of turbine rotor blades 110 are coupled within the rotor assembly, a shank cavity 145 is defined between adjacent rotor blade shanks 125. In addition to shank cavity 145, when a plurality of turbine rotor blades 110 are coupled to turbine rotor wheel 105, a predetermined platform gap 155 is formed between the circumferentially adjacent turbine rotor blades 110. To control stresses within and impacts between adjacent turbine rotor blades 110 that would otherwise exist given their close proximity and lack of interconnectedness at shank 125, damper pin 150 can be used. Damper pin 150 resides within slots machined within shank 125 and by interconnecting turbine rotor blades 110, damper pin 150 can reduce the stresses within and potential impacts between adjacent turbine rotor blades 110.

As hot combustion gases flow across turbine rotor blades 110 for energy conversion, turbine rotor wheel 105 can be heated beyond its metallurgical limits by convection, conduction, and radiation heating. Conduction heating, for example, occurs as hot combustion gases flow across turbine rotor blade 110. These hot gases heat turbine rotor blade 110, raising the operational temperature of turbine rotor blade 110 so that turbine rotor blade 110, being in contact with turbine rotor wheel 105, conducts heat from the hot combustion gases to turbine rotor wheel 105. Convection heating occurs as hot combustion gases flow across blade platform 120. Given this air flow across platform 120 and the air gap at platform gap 155, hot air can leak into shank cavity 145. This movement of hot air, therefore, raises the temperature of shank cavity 145, wheel posts 140, and the top of turbine rotor wheel 105. What is more, as hot air flows across blade platform 120, the temperature of radial outer surface 121 is increased to a point where a significant amount of heat radiates from radial inner surface 122 into shank cavity 145.

Given their metallurgical limitations and the amount of heat exposure the components of turbine rotor blade 110 must endure, turbine rotor blade 110 can be adapted to include an interior cooling cavity. This internal cooling cavity can be defined at least partially by airfoil 115, blade platform 120, shank 125, and dovetail 130. In a gas turbine application, cooling air can be extracted from the compressor and circulated within this internal cooling cavity, or it can even be directed to pressurize shank cavity 145 so that the leakage of hot combustion gases into shank cavity 145 can be controlled.

FIG. 2 illustrates a cross-sectional view 200 of turbine rotor wheel 105 also found in the prior art. In FIG. 2, cooling air is provided at 205 and 210 to pressurize shank cavity 145. Because of the air leakage around shank cavity 145, especially through platform gap 155, a large amount of cooling air is required to pressurize and cool shank cavity 145. While this cooling air leakage can lower the temperature of the surrounding air in the wheel space region at 215, 220, 225, and 230 and the axially flowing air through shank cavity 145 at 216, the air in these regions is still significantly warm. Thus, the cooling air is unable to cool all of the hot air in the region as hot air flow continues across shank cavity 145 at 260, 265, and 270 through platform gap 155, and around shank cavity 145 at 275, 280, and 285. As a result, a large amount of heat is transferred to the top of turbine rotor wheel 105 as illustrated by raised node 290 in FIG. 2.

To slow the amount of hot air flowing through platform gap 155 and across shank cavity 145, platform gap 155 can be sealed. For example, referring again to FIG. 1, in the absence of cooling air, or in conjunction with it, seal body 160 can be employed for air control. Seal body 160 includes a cover plate 165 and mounting assembly 166 for mounting seal body 160 atop post 140 and between adjacent turbine rotor wheels 110. Seal body 160 provides axial sealing and blocks some leakage of hot combustion gases via platform gap 155 into shank cavity 145. When shank cavity 145 is pressurized with cooling air, seal body 160 can be adapted to route cooling air between shank cavity 145 and dovetail 130.

Even when employed, though, seal body 160 can not prevent hot air leakage into shank cavity 145. Rather, seal body 160 can only slow such leakage. At the same time, seal body 160 adds mass to turbine rotor wheel 105 causing unnecessary physical stresses during the wheel's rotation. Cover plate 165, meanwhile, itself being exposed to the hot exhaust gases, becomes an additional source of heat to shank cavity 145 as it absorbs heat from the hot exhaust gases and then radiates a portion of this heat into the cavity. The combination of this leakage and radiation continues to substantially increase the temperature of shank cavity 145. Because dovetails 130, wheel posts 140, and the top of turbine rotor wheel 105 are exposed to hot air within shank cavity 145, thermal stresses are induced in these parts, leading to their failure. To prevent or otherwise minimize the chances of such failure, it is desirable to thermally isolate these components from some or all of the heating effects described above.

FIG. 3 illustrates an exemplary system 300 for thermally isolating a turbine rotor wheel according to one embodiment of the invention. Like system 100, system 300 includes a turbine rotor wheel supporting a plurality of turbine rotor blades 110 with airfoils 115. Other similar components include the following: blade platform 120 with radial outer surface 121 and radial inner surface 122; shank 125 where when multiple shanks are abutted together, shank cavity 145 and platform gap 155 are formed; and dovetail 130 adapted to fit between wheel posts 140 and into slot 135.

System 300 also includes isolation seal 350. Isolation seal 350 can be fixed within shank cavity 145 and positioned slightly above wheel post 140, dividing shank cavity 145 into upper region 345 and lower region 355. As previously described, in prior art system 100, hot air flowing across blade platform 120 and through platform gap 155 can cause convective heating effects in the turbine rotor wheel. By placing isolation seal 350 within shank cavity 145 and slightly above wheel post 140, the top of the turbine rotor wheel can be isolated from a significant portion of the hot air flowing through shank cavity 145, which reduces these convective heating effects, which is at least one technical effect associated with an embodiment of the invention. Isolation seal 350 can also reduce radiation effects found in prior art system 100. As a result of hot air flowing across blade platform 120, the temperature of blade platform 120 is raised to a point where heat radiates from radial inner surface 122 and into shank cavity 145. In system 300, isolation seal 350 can provide an insulating barrier that blocks at least a portion of this heat being radiated from blade platform 120 at radial inner surface 122, which is at least one technical effect associated with an embodiment of the invention.

Moreover, by dividing shank cavity 145 into upper region 345 and lower region 355, isolation seal 350 can create a barrier of air within lower region 355 of shank cavity 145 that is cooler than the air temperature within upper region 345 of shank cavity 145. This cooler air can reduce the temperature of dovetail 130, wheel post 140, and the top of turbine rotor wheel 105. In the exemplary embodiment, for example, isolation seal 350 can reduce the temperature of wheel post 140 by about 10° F.-20° F. This reduction in air temperature surrounding these components can reduce the thermal stresses experienced therein, which is at least one technical effect associated with an embodiment of the invention. Because these components experience reduced thermal stresses, they can endure higher physical stresses, meaning that isolation seal 350 can enable smaller and more economical designs. For example, when dovetail 130 operates at a lower temperature, dovetail 130 has a higher material capability and can tolerate higher stresses. Thus, dovetail 130 can accommodate a smaller design because it has more capacity to endure physical stresses. In the alternative, the size of dovetail 130 can be maintained in favor of using cheaper manufacturing materials. Still, as yet another alternative, the combination of a smaller and cheaper design can be used.

In exemplary system 300, isolation seal can be positioned slightly above wheel post 140 and fixed within shank cavity 145. In the exemplary design, isolation seal 350 can be designed to fit snugly within shank cavity 145 so that the combination of friction and a temperature resistant fastener can be used to hold isolation seal 350 into place. In other embodiments, shank 125 can be adapted to include mounting supports for isolation seal 350, as can turbine wheel posts 140. Alternatively, shank 125 can also be adapted so that part of isolation seal 350 is formed when multiple shanks are abutted together when mounted to the turbine rotor wheel. These embodiments, along with others, are more fully described below.

Isolation seal 350 can be manufactured from any single material or combination of materials. In general these materials can include steel and/or nickel based alloys. In particular, commercially available materials such as GTD111, Rene N5, L605, X750, and IN-738 can also be used.

In one embodiment of exemplary system 300, shank cavity 145 is not pressurized with cooling air. In another embodiment, shank cavity 145 can be pressurized with cooling air. FIG. 4 illustrates one exemplary embodiment 400 in cross section where shank cavity 145 is so pressurized. In FIG. 4, isolation seal 450 can divide shank cavity 145 into upper region 445 and lower region 455.

In FIG. 4, cooling air can be provided at 405 and 410. The cooling air can continue to cool the air surrounding the turbine rotor wheel space region at 215, 220, 225, and 230 so that the surrounding air can be mildly warm. In addition, hot air flow can continue to flow through platform gap 155 and across shank cavity 145 at 460, 465, and 470, and around shank cavity 145 at 475, 480, and 485. In the exemplary embodiment, though, because isolation seal 450 divides shank cavity 145 into upper region 445 and lower region 455, hotter air can be contained in upper region 445. This containment results because even though some mildly warm air can continue to flow axially through gap 155 and across lower region 455 as shown at 416, lower region 455 can be insulated from heat being radiated from blade platform 120 at radial inner surface 122 by thermal isolation seal 450. Consequently, a lesser amount of heat will be transferred to the top of turbine rotor wheel 105 in embodiment 400 when compared to prior art systems. This change in relative temperature is illustrated by the slightly lowered node 490 in FIG. 4.

FIGS. 5A-5D illustrate various example embodiments of a thermal isolation seal according to certain aspects of the invention. In FIG. 5A, at view 500, pin seal 505 is illustrated according to one embodiment of the invention. Pin seal 505 can comprise a pin that can be adapted to fit within at least one contour machined in turbine rotor blade 110 and can divide the shank cavity into an upper region and a lower region. It will be appreciated that pin seal 505 can provide support and vibration control between turbine rotor blades 110. In one embodiment, pin seal 505 can be employed in addition to other supporting structures like damper pin 155 in FIG. 1. In another embodiment, pin seal 505 can replace such structures.

In FIG. 5B, at view 525, shelf seal 530 is illustrated according to one embodiment of the invention. Shelf seal 530 can be formed from one or more flanges manufactured as part of turbine rotor blade 110. When two turbine rotor blades 110 are mounted side-by-side to turbine rotor wheel 105, these flanges can overlap so that an air gap is formed. Along with this air gap, an upper region above the upper flange and a lower region below the lower flange can likewise be formed within the shank cavity. According to this embodiment, a limited amount of cool air leakage into the upper region via the air gap when the shank cavity is pressurized with cooling air can be provided.

In FIG. 5C, at view 550, plate seal 555 is illustrated according to another embodiment of the invention. Plate seal 555 can be a flat, planar structure adapted to fit within one or more slots machined into turbine rotor blade 110. In FIG. 5D, at view 575, plate seal 555 can be further adapted to be a plate seal and tail assembly 580 according to yet another embodiment of the invention. In this embodiment, wheel post 140 can be adapted to include a T-shaped slot for mounting of the tail assembly, and turbine rotor wheels 110 can likewise be machined with the aforementioned slots. In both embodiments, plate seal 555 and plate seal and tail assembly 580 can partition the shank cavity into an upper region and lower region as described above.

According to yet another embodiment of the invention, a thermal isolation seal can be adapted to include a cover plate. FIG. 6 illustrates one exemplary embodiment 600 of isolation seal 450 in cross section where shank cavity 145 is pressurized with cooling air and where isolation seal 450 has been further adapted to include cover plate 650. As was shown in FIG. 4, isolation seal 450 can divide shank cavity 145 into an upper region 445 and a lower region 455. Hot air flow also can continue to flow across shank cavity 145 through upper region 445 at 660, 665, and 670, and around shank cavity 145 at 675, 680, and 685, keeping upper region at a higher operational temperature than lower region 455. Also similar to FIG. 4, cooling air can be provided at 605 and 610.

Unlike FIG. 4, though, while cooling air can continue to cool the air surrounding the turbine rotor wheel space region at 615, 620, and 625 so that the surrounding air can be mildly warm, this mildly warm air can be prevented from flowing axially through platform gap 155 by cover plate 650. At the same time, this mildly warm air can be replaced with dedicated cooling air as shown at 611 and 612. Thus, by sealing gap 155 and using a dedicated supply of cooling air, lower region 455 can be maintained at an even lower operational temperature than if isolation seal 450 were employed alone. As shown by node 690, because cooling air can be maintained within lower region 455, the amount of heat transferred to the top of turbine rotor wheel 105 in embodiment 600 is much less when compared to prior art systems.

In the exemplary embodiment, the use of an isolation seal adapted to include a cover plate can reduce the temperature of wheel post 140 by about 75° F. With such a large reduction of temperature at wheel post 140 and the surrounding area, a lesser amount of cooling air is needed for cooling these components. Consequently, when embodiments of the invention are employed in a gas turbine, more air can be provided to the compressor rather than taken from it. By providing additional air to the compressor, there is less thermodynamic loss in the engine cycle, and the overall efficiency of the gas turbine system can be increased.

FIG. 7 illustrates an exemplary method 700 for thermally isolating a turbine rotor wheel, where the turbine rotor wheel includes a pair of wheel posts, or shanks, supporting a plurality of turbine rotor blades. When multiple turbine rotor blades are supported by the turbine rotor wheel, a shank cavity is formed between respective shanks, or wheel posts, of the turbine rotor blades. At block 705, at least one seal operable to partition the shank cavity into an upper region and a lower region can be provided.

At block 710, the seal can be inserted within the shank cavity so that the temperature in the lower region can be maintained at a lower temperature than the temperature in the upper region. At block 715, a source of cooling air can be provided, and at block 720, the cooling air can be used to pressurize the shank cavity. As previously described, pressurizing the shank cavity with cooling air can reduce the hot air flow into the shank cavity, and thereby can reduce the operational temperature of air with the shank cavity and components surrounding the shank cavity.

In one embodiment, the seal employed in method 700 can be isolation seal 350 illustrated in FIG. 3. In other embodiments, this seal can be one or more of the seals illustrated in FIG. 5, including pin seal 505, shelf seal 530, plate seal 555, or plate seal and tail assembly 580. In yet another embodiment, this seal can be further adapted to include a cover plate. The cover plate can be operable to cover a portion of the blade post and further operable to direct cooling air flow around a portion of the at least one cover plate and into the shank cavity. In yet another embodiment, the cover plate can be further adapted to provide axial sealing such that hot air is prevented from flowing between respective blade posts. In still yet another embodiment, the isolation seal can comprise one or more of the embodiments described above and can partition the shank cavity into multiple regions.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for thermally isolating a turbine rotor wheel comprising a pair of blade posts supporting respective turbine blades and a cavity between respective blade posts, the method comprising:
    providing at least one seal operable to partition the cavity into an upper region and a lower region, each of the upper region and lower region operable to receive cooling air flow; and
    inserting the at least one seal within the cavity, wherein cooling air flow into the cavity is divided between at least the lower region and at least the upper region, and wherein the lower region is maintained at a lower temperature than the upper region.

2. The method of claim 1, wherein the at least one seal comprises a pin operable to fit within at least one contour in the cavity, wherein the pin divides cooling air flow between the upper region and the lower region.

3. The method of claim 1, wherein the at least one seal comprises a shelf seal formed by flanges associated with each of the blade posts, wherein the flanges overlap in close proximity with each other to divide cooling air between the upper region and the lower region.

4. The method of claim 1, wherein the at least one seal comprises a plate seal operable to fit within at least one slot associated with the blade posts, and wherein the plate seal mounts to an upper portion of the at least one slot, and divides air between the upper region and the lower region.

5. The method of claim 1, wherein the at least one seal comprises a plate seal and tail assembly operable to fit within a T-shaped slot associated with the blade posts, and wherein the plate seal and tail assembly mount to an upper portion and lower portion of the T-shaped slot and divide cooling air between the upper region and the lower region.

6. The method of claim 1, further comprising:
    providing a source of cooling air flow; and
    pressurizing the cavity with the cooling air, wherein hot gas flow into the cavity is reduced.

7. The method of claim 1, further comprising:
    providing at least one cover plate operable to cover a portion of the blade posts and further operable to direct cooling air flow around a portion of the at least one cover plate and into the cavity.

8. The method of claim 1, wherein the at least one seal comprises at least one of the following: a pin; a shelf seal; a plate seal; or a plate seal and tail assembly.

9. The method of claim 8, further comprising:
providing a source of cooling air flow; and
pressurizing the cavity with the cooling air flow, wherein hot gas flow into the cavity is reduced.

10. The method of claim 9, further comprising:
providing at least one cover plate operable to cover a portion of the blade posts and further operable to direct cooling air flow around a portion of the at least one cover plate and into the cavity.

11. A system for thermally isolating a turbine rotor wheel comprising:
a plurality of turbine blades;
a plurality of blade posts mounted to the turbine rotor wheel and operable to support one or more turbine blades, wherein a cavity is formed between respective blade posts; and
at least one seal mounted within the cavity and operable to partition the cavity into an upper region and a lower region, each of the upper region and lower region operable to receive cooling air flow, wherein cooling air flow into the cavity is divided between at least the lower region and at least the upper region, and wherein the lower region is maintained at a lower temperature than the upper region.

12. The system of claim 11, wherein the at least one seal comprises:
a pin operable to fit within the cavity; and
wherein the blade posts are further operable to include at least one contour for receiving the pin, and wherein the pin is operable to partition the cavity region above the at least one contour into the upper region and the region below the at least one contour into the lower region.

13. The system of claim 11, wherein the at least one seal comprises:
a shelf seal; and
wherein the blade posts are further operable to include flanges that overlap in close proximity with each other to form the shelf seal, and wherein the shelf seal is operable to partition the cavity region above the flanges into the upper region and the region below the flanges into the lower region.

14. The system of claim 11, wherein the at least one seal comprises:
a plate seal operable to fit within the blade posts; and
wherein the blade posts are further operable to include at least one slot for receiving the plate seal, and wherein the plate seal is operable to partition the cavity region above the at least one slot into the upper region and the region below the at least one slot into the lower region.

15. The system of claim 11, wherein the at least one seal comprises:
a plate seal and tail assembly operable to fit within the blade posts; and
wherein the blade posts are further operable to include a T-shaped slot for receiving the plate seal and tail assembly, and wherein the plate seal and tail assembly is operable to partition the cavity region above the T-shaped slot into the upper region and the region below the at least one slot into the lower region.

16. The system of claim 11, further comprising:
a source of cooling air operable to pressurize the cavity with the cooling air, wherein hot gas flow into the cavity is reduced.

17. The system of claim 11, further comprising:
at least one cover plate operable to cover a portion of the blade posts and further operable to direct cooling air flow around a portion of the at least one cover plate and into the cavity.

18. The system of claim 11, wherein the seal comprises at least one of the following: a pin; a shelf seal; a plate seal; or a plate seal and tail assembly.

19. An apparatus for thermally isolating a gas turbine rotor wheel comprising a pair of blade posts supporting respective turbine blades and a cavity between respective blade posts, the apparatus comprising:
an elongated sealing piece operable to mount within the cavity, and further operable to partition the cavity into an upper region and a lower region, each of the upper region and lower region operable to receive cooling air flow, wherein cooling air flow into the cavity is divided between at least the lower region and at least the upper region, and wherein the lower region is maintained at a lower temperature than the upper region.

20. The apparatus of claim 19, wherein the elongated sealing piece comprises at least one of the following: a pin; a shelf seal; a plate seal; or a plate seal and tail assembly.

* * * * *